(12) United States Patent
Tatsuma et al.

(10) Patent No.: US 8,925,850 B2
(45) Date of Patent: Jan. 6, 2015

(54) WEBBING RETRACTOR

(75) Inventors: Atsushi Tatsuma, Aichi-ken (JP); Akira Sumiyashiki, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 728 days.

(21) Appl. No.: 13/115,503

(22) Filed: May 25, 2011

(65) Prior Publication Data

US 2011/0290929 A1      Dec. 1, 2011

(30) Foreign Application Priority Data

May 27, 2010    (JP) ................................. 2010-122025

(51) Int. Cl.
*B60R 22/41* (2006.01)
*B60R 22/38* (2006.01)

(52) U.S. Cl.
CPC ................ *B60R 22/41* (2013.01); *B60R 22/38* (2013.01)
USPC .................................... 242/383.1; 242/383.2

(58) Field of Classification Search
CPC ........ B60R 22/38; B60R 22/405; B60R 22/41
USPC ..................... 242/383.1, 383.2, 383.4, 384.1; 280/806, 807; 297/478
See application file for complete search history.

(56) References Cited

U.S. PATENT DOCUMENTS

| | | | | |
|---|---|---|---|---|
| 4,485,986 A | * | 12/1984 | Sugimoto ................... | 242/383.1 |
| 6,152,393 A | * | 11/2000 | Ando et al. ................ | 242/382.2 |
| 6,883,742 B2 | * | 4/2005 | Sumiyashiki et al. ..... | 242/383.1 |
| 2005/0224623 A1 | * | 10/2005 | Sumiyashiki .............. | 242/384.2 |
| 2007/0290091 A1 | | 12/2007 | Mori | |
| 2008/0210802 A1 | * | 9/2008 | Sumiyashiki .............. | 242/379.1 |
| 2009/0218432 A1 | | 9/2009 | Aihara | |
| 2010/0147986 A1 | | 6/2010 | Mori | |

FOREIGN PATENT DOCUMENTS

| | | |
|---|---|---|
| EP | 2033857 A1 | 3/2009 |
| JP | 2004074828 A | 3/2004 |
| JP | 2008-24284 | 2/2008 |
| JP | 2009202809 A | 9/2009 |

OTHER PUBLICATIONS

European Office Action issued on Oct. 4, 2012 in EP Application 11167623.5.
Japanese Office Action dated Sep. 24, 2013 in JP Application 2010-122025 and English translation of Notice of Reasons for Rejection.

\* cited by examiner

*Primary Examiner* — Sang Kim
*Assistant Examiner* — Scott Haugland
(74) *Attorney, Agent, or Firm* — Roberts Mlotkowski Safran & Cole P.C.

(57) ABSTRACT

A webbing retractor includes a retracting shaft; a lock member regulating the rotation of the retracting shaft in the pulled-out direction; a rotating body connected to the retracting shaft; a rotation detecting member that is relatively displaced with respect to the rotating body by inertial force, by which rotation of the rotating body in the pulled-out direction is regulated, and by which the lock member is actuated; and a regulating member having an engaging portion that engages with the rotation detecting member because of the rotation of the rotating body in the retraction direction. The engagement of the engaging portion with the rotation detecting member is released as the engaging portion is displaced toward a radial direction inside of the rotating body by the rotation of the rotating body in the pulled-out direction.

4 Claims, 3 Drawing Sheets

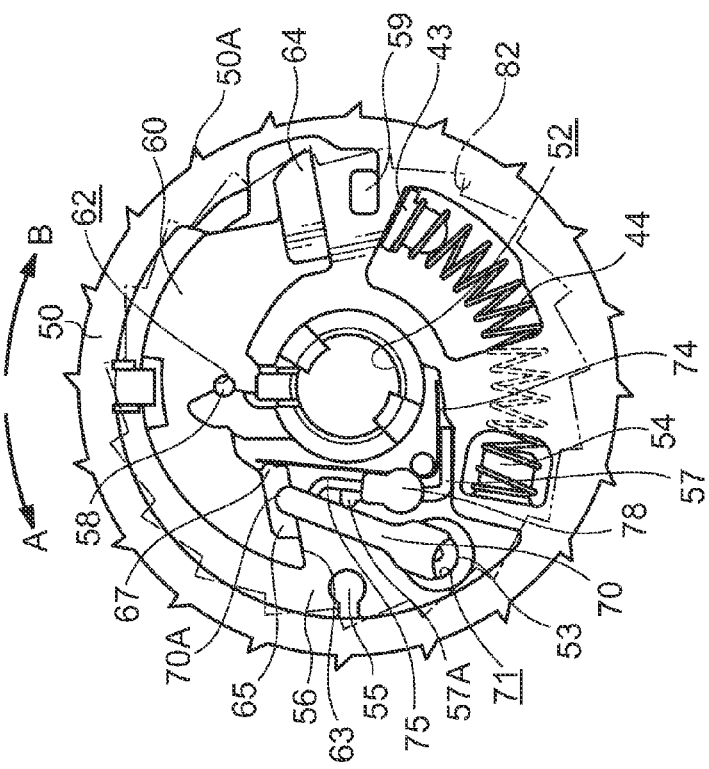
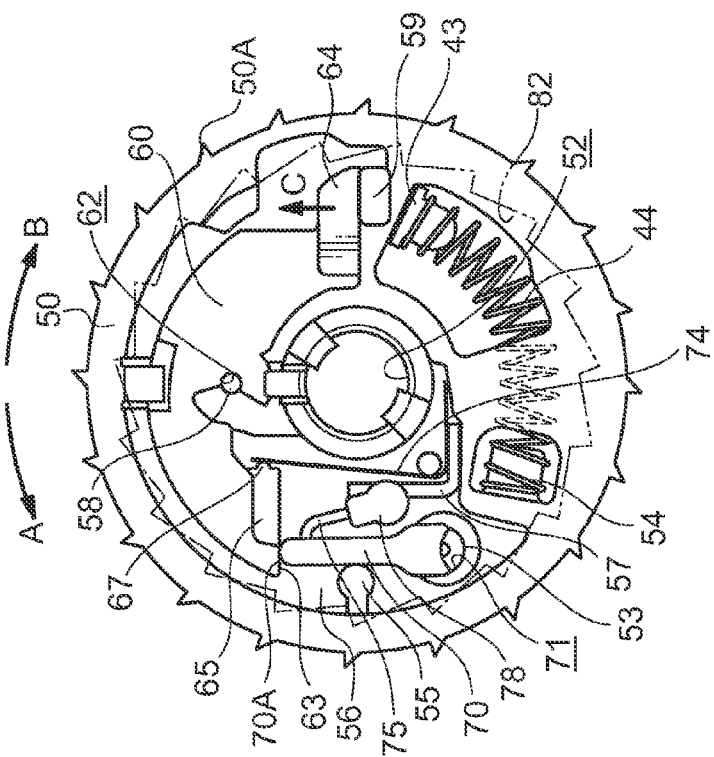
FIG.1A
FIG.1B

WEBBING RETRACTOR

CROSS-REFERENCE TO RELATED APPLICATION

This application claims priority under 35 USC 119 from Japanese Patent Application No. 2010-122025 filed on May 27, 2010, the disclosure of which is incorporated by reference herein.

BACKGROUND OF THE INVENTION

1. Technical Field

The present invention relates to a webbing retractor that retracts webbing worn on an occupant of a vehicle.

2. Related Art

In the webbing retractor described in the third embodiment of Japanese Patent Application Laid-Open (JP-A) No. 2008-24284, a V gear is configured to be capable of following the rotation of a spool. A lever and an inertial mass are supported on the V gear. A lock groove is disposed in one end of the inertial mass, and a hook of the lever is configured to be capable of engaging with the lock groove from the radial direction outside of the V gear.

When a webbing belt is abruptly pulled out from the spool, the V gear is rotated following the spool and the lever is rotated in a pulled-out direction, whereby the lever rotates toward the radial direction outside of the V gear. Because of this, the hook of the lever is moved away from the lock groove in the inertial mass and the inertial mass is swung relatively with respect to the V gear by inertial force (including centrifugal force).

On the other hand, when the webbing belt is to be retracted onto the spool, the V gear is rotated following the spool and the lever is rotated in a retraction direction, whereby the lever rotates toward the radial direction inside of the V gear. Because of this, the hook of the lever engages with the lock groove in the inertial mass and the relative swinging of the inertial mass with respect to the V gear is regulated.

Here, in the above webbing retractor, when the hook of the lever is moved away from the lock groove in the inertial mass, the hook of the lever is displaced toward the radial direction outside of the V gear from the lock groove in the inertial mass. For this reason, it is necessary to dispose space in which the hook of the lever is displaced to the radial direction outside of the V gear from the position of the lock groove in the inertial mass, and the V gear increases in size.

SUMMARY

In consideration of the above circumstances, the present invention provides a webbing retractor that can miniaturize a rotating body such as a V gear.

A webbing retractor of a first aspect of the present invention includes: a retracting shaft onto which webbing worn on an occupant of a vehicle is retracted as a result of being rotated in a retraction direction and which is rotated in a pulled-out direction as a result of the webbing being pulled out; a lock member that regulates the rotation of the retracting shaft in the pulled-out direction as a result of being actuated; a rotating body that is connected to, so as to be capable of following the rotation of, the retracting shaft; a rotation detecting member that is disposed so as to be relatively displaceable in the rotating body, is relatively displaced with respect to the rotating body by inertial force in a case where the rotating body has been rotated in the pulled-out direction, by which rotation of the rotating body in the pulled-out direction is regulated, and by which the lock member is actuated; and a regulating member that is disposed in the rotating body, has an engaging portion that engages with the rotation detecting member because of the rotation of the rotating body in the retraction direction. The regulating member regulates the relative displacement of the rotation detecting member with respect to the rotating body resulting from rebound of the stopping of the retraction of the webbing onto the retracting shaft, and the engagement of the engaging portion with the rotation detecting member is released as a result of the engaging portion being displaced toward a radial direction inside of the rotating body by the rotation of the rotating body in the pulled-out direction.

A webbing retractor of a second aspect of the present invention is the webbing retractor of the first aspect, wherein the regulating member may have: an engaging member that is rotatably supported in the rotating body and has the engaging portion; and a frictional force generating member that is secured to the engaging member, is disposed extending toward the engaging portion from a center of rotation of the engaging member. The frictional force generating member generates frictional force because of the rotation of the rotating body in the pulled-out direction, and by which the engaging portion is displaced toward the radial direction inside of the rotating body.

A webbing retractor of a third aspect of the invention is the webbing retractor of the first aspect or the second aspect, wherein the rotation detecting member may have an avoiding portion that avoids the engagement of the engaging member when the engaging portion has been displaced toward the radial direction inside of the rotating body.

In the webbing retractor of the first aspect, the webbing is retracted onto the retracting shaft as a result of the retracting shaft being rotated in the retraction direction. Moreover, the retracting shaft is rotated in the pulled-out direction as a result of the webbing being pulled out from the retracting shaft. Further, the rotating body is connected to, so as to be capable of following the rotation of the retracting shaft, and the regulating member is disposed in the rotating body.

When the rotating body has been rotated in the pulled-out direction and the rotation detecting member has been relatively displaced with respect to the rotating body by inertial force, the rotation of the rotating body in the pulled-out direction is regulated and the lock member is actuated. Because of this, the lock member regulates the rotation of the retracting shaft in the pulled-out direction.

Moreover, the regulating member has the engaging portion, and the engaging portion engages with the rotation detecting member because of the rotation of the rotating body in the retraction direction, whereby the regulating member regulates the relative displacement of the rotation detecting member with respect to the rotating body resulting from the reaction of the stopping of the retraction of the webbing onto the retracting shaft. Because of this, the lock member is not actuated, so the rotation of the retracting shaft in the pulled-out direction is not regulated.

Here, the engagement between the engaging portion of the regulating member and the rotation detecting member is released as a result of the engaging portion of the regulating member being displaced toward the radial direction inside of the rotating body by the rotation of the rotating body in the pulled-out direction.

For this reason, it is not necessary to dispose space in which the engaging portion of the regulating member is displaced toward the radial direction outside of the rotating body from the position of engagement between the rotation detecting member and the engaging portion, so the rotating body can be miniaturized.

In the webbing retractor of the second aspect, the regulating member is equipped with the engaging member and the frictional force generating member. The engaging member is rotatably supported in the rotating body and has the engaging portion. Moreover, the frictional force generating member is secured to the engaging member, the frictional force generating member generates frictional force because of the rotation of the rotating body in the pulled-out direction, and the engaging portion is displaced toward the radial direction inside of the rotating body.

Here, the frictional force generating member is disposed extending toward the engaging portion from the center of rotation of the engaging member. For this reason, the overlapping portion in the rotating body between the placement region of the engaging member and the placement region of the frictional force generating member can be made large. Because of this, the region for placing the engaging member and the frictional force generating member in the rotating body can be made small, and the rotating body can be miniaturized.

In the webbing retractor of the third aspect, the rotation detecting member has the avoiding portion, and the avoiding portion avoids the engagement of the engaging portion with the rotation detecting member when the engaging portion has been displaced toward the radial direction inside of the rotating body.

For this reason, it is not necessary to form the avoiding portion on the rotating body radial direction outside portion of the rotation detecting member, so the weight of the rotating body radial direction outside portion of the rotation detecting member can be made large. Because of this, the rotation detecting member is efficiently relatively displaced by inertial force, but the rotation detecting member can be miniaturized and the rotating body can be miniaturized.

BRIEF DESCRIPTION OF THE DRAWINGS

An embodiment of the present invention will be described in detail based on the following figures, wherein:

FIG. 1A and FIG. 1B show the configuration of a lock mechanism in a webbing retractor pertaining to the embodiment of the present invention, with FIG. 1A being a plan view showing a state where a W pawl is held in a standby state in a V gear and FIG. 1B being a plan view showing a state where the W pawl is engaged with ratchet teeth;

DETAILED DESCRIPTION OF THE INVENTION

An example of an embodiment of the present invention will be described in detail below with reference to the drawings.

Figure 2:
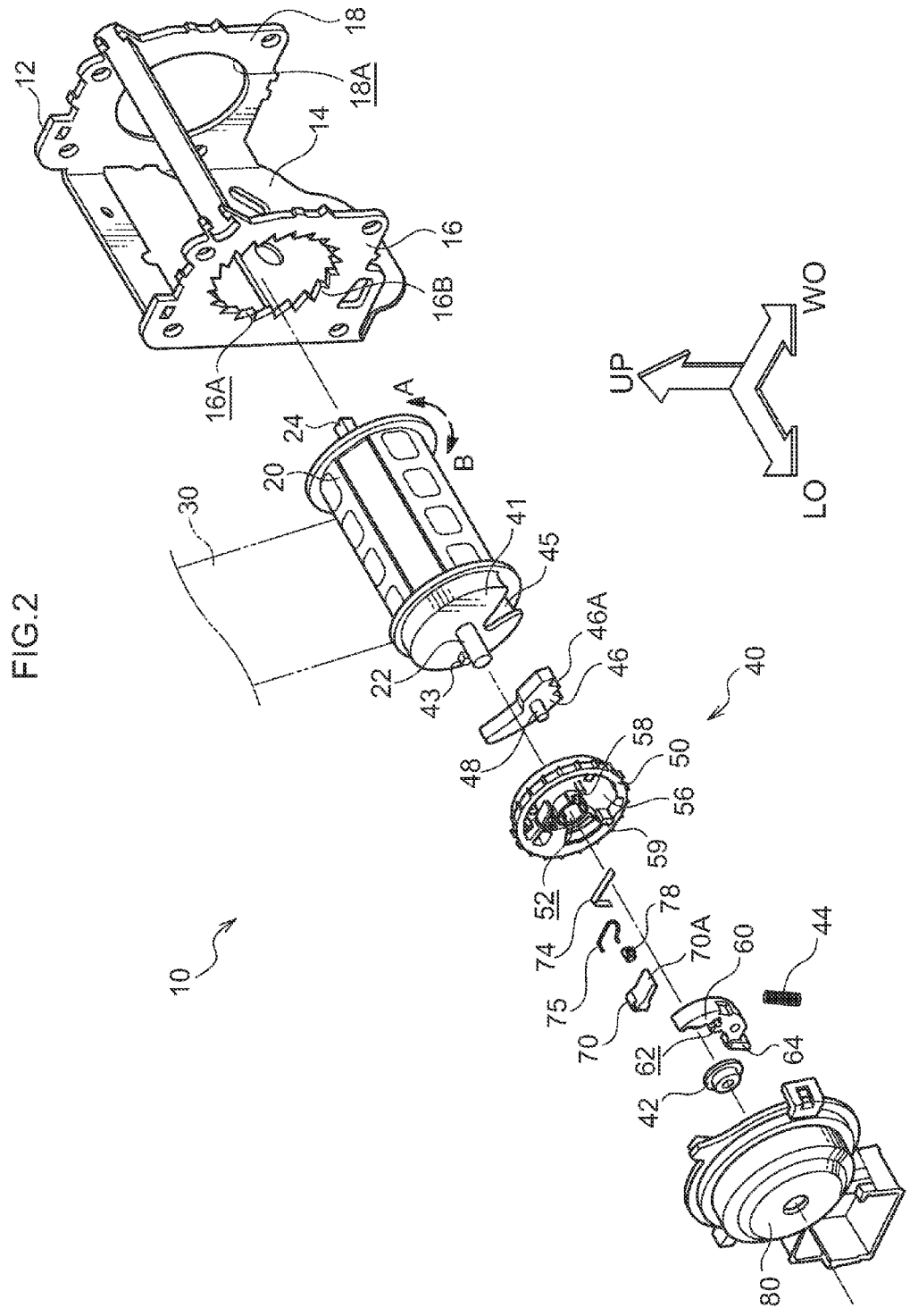
FIG. 2 is an exploded perspective view showing the webbing retractor pertaining to the embodiment of the present invention.

In FIG. 2, the overall configuration of a webbing retractor 10 pertaining to the embodiment of the present invention is shown in an exploded perspective view. In the drawing, arrow LO represents one side in a vehicle longitudinal direction, arrow WO represents one side in a vehicle width direction, and arrow UP represents a vehicle up direction.

As shown in FIG. 2, the webbing retractor 10 is equipped with a frame 12. The frame 12 is configured by a substantially plate-like back plate 14 and by a leg plate 16 and a leg plate 18 that integrally extend out from both width direction ends of the back plate 14. The leg plate 14 is secured to a vehicle body by unillustrated fastening means such as bolts, whereby the webbing retractor 10 is attached to the vehicle body. A circular placement hole 16A and a circular placement hole 18A are penetratingly formed in the leg plate 16 and in the leg plate 18, respectively, and ratchet teeth 16B (inner teeth) are formed on the outer periphery of the placement hole 16A.

A spool 20 serving as a retracting shaft manufactured by die casting or the like is rotatably placed between the leg plate 16 and the leg plate 18. The spool 20 has a drum shape overall, and a proximal end portion of webbing 30 formed in an elongate band is connectedly secured to the spool 20. When the spool 20 is rotated in one direction about its axis (the direction of arrow A in FIG. 2; this direction will be called a "retraction direction" below), the webbing 30 is retracted from its proximal end side in layers onto the outer peripheral portion of the spool 20. On the other hand, when the webbing 30 is pulled from its distal end side, in accompaniment therewith the spool 20 rotates in the other direction about its axis (the direction of arrow B in FIG. 2; this direction will be called a pull-out direction" below) and the webbing 30 is pulled out.

A substantially cylindrical support shaft 22 is integrally disposed on the leg plate 16 side of the spool 20. The support shaft 22 projects via the placement hole 16A outside the leg plate 16 of the frame 12. A substantially rectangular prism-shaped support shaft 24 is integrally disposed on the leg plate 18 side of the spool 20. The support shaft 24 is placed coaxially with the support shaft 22 and projects via the placement hole 18A outside the leg plate 18 of the frame 12.

A spiral spring (not shown) serving as retracting means is placed outside the leg plate 18 of the frame 12. The spiral direction outside end of the spiral spring is connected to the leg plate 18 (the frame 12). The spiral direction inside end of the spiral spring is secured to the support shaft 24 of the spool 20. The spiral spring biases the spool 20 in the retraction direction.

A lock mechanism 40 is disposed outside the leg plate 16 of the frame 12. The lock mechanism 40 is equipped with a sensor holder 80. The sensor holder 80 is formed in a concave shape opening toward the leg plate 16 side and is secured to the leg plate 16. As shown in FIG. 1, ratchet teeth 82 (inner teeth) are annularly formed inside the sensor holder 80. The ratchet teeth 82 correspond to an engaging tooth 64 of a W pawl 60 described later.

As shown in FIG. 2, a lock base 41 is integrally disposed on the end portion of the spool 20 on the leg plate 16 side. The support shaft 22 projects from the lock base 41. The spool 20, the support shaft 22, and the lock base 41 are configured to be coaxially and integrally rotatable. A bush 42 is secured to the distal end portion of the support shaft 22. The bush 42 is rotatably supported in the sensor holder 80, whereby the support shaft 22 is rotatably supported in the sensor holder 80 via the bush 42.

A locking convex portion 43 is disposed on the lock base 41. The locking convex portion 43 corresponds to a return spring 44 described later. Further, a movement notch 45 is formed in the lock base 41, and a plate-like lock plate 46 serving as a lock member is movably placed inside the movement notch 45.

A cylindrical guide projection 48 is integrally formed on the lock plate 46. The guide projection 48 projects outside the leg plate 16 of the frame 12 from the lock plate 46. Ratchet teeth 46A are formed on one end of the lock plate 46. The ratchet teeth 46A are configured to be meshable with the ratchet teeth 1613 of the leg plate 16 as a result of the lock plate 46 being moved inside the movement notch 45 toward the radial direction outside of the lock base 41.

As shown in FIG. 1 and FIG. 2, a V gear 50 serving as a rotating body is housed inside the sensor holder 80. The V gear 50 is formed in a disc shape, and a through hole 52 is disposed in the central portion of the V gear 50. The support shaft 22 of the spool 20 penetrates the through hole 52 between the lock base 41 and the bush 42. Because of this, the V gear 50 is coaxially rotatably attached to the support shaft 22 of the spool 20.

A locking projection 54 is disposed on the side surface of the V gear 50 on the lock base 41 side. A return spring 44 bridges the distance between the locking projection 54 and the locking convex portion 43 of the lock base 41. The return spring 44 is a compression coil spring and biases the V gear 50 in the pulled-out direction with respect to the lock base 41.

Figure 3A:
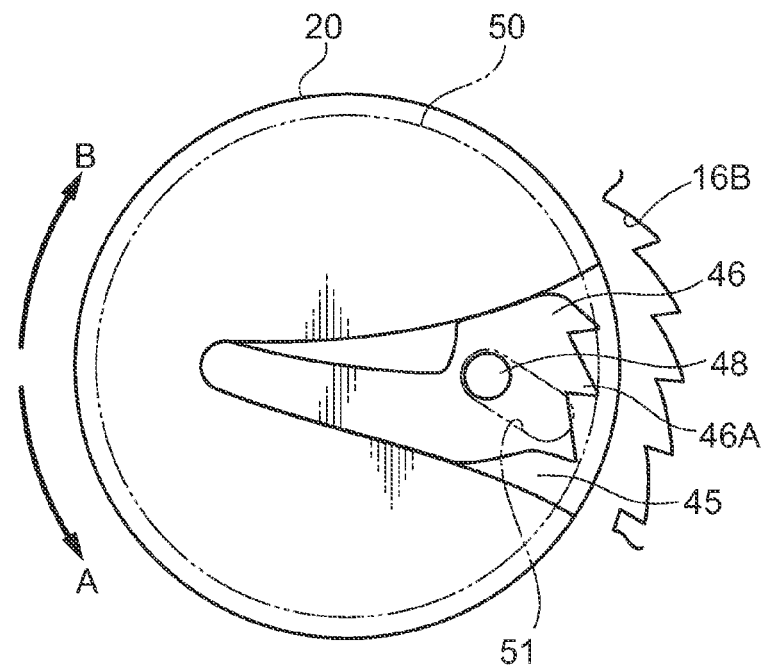
FIG. 3A and FIG. 3B show the configuration of the lock mechanism in the webbing retractor pertaining to the embodiment of the present invention, with FIG. 3A being a plan view showing a state where a lock plate has been moved away from ratchet teeth and FIG. 3B being a plan view showing a state where the lock plate is engaged with the ratchet teeth.
Figure 3B:
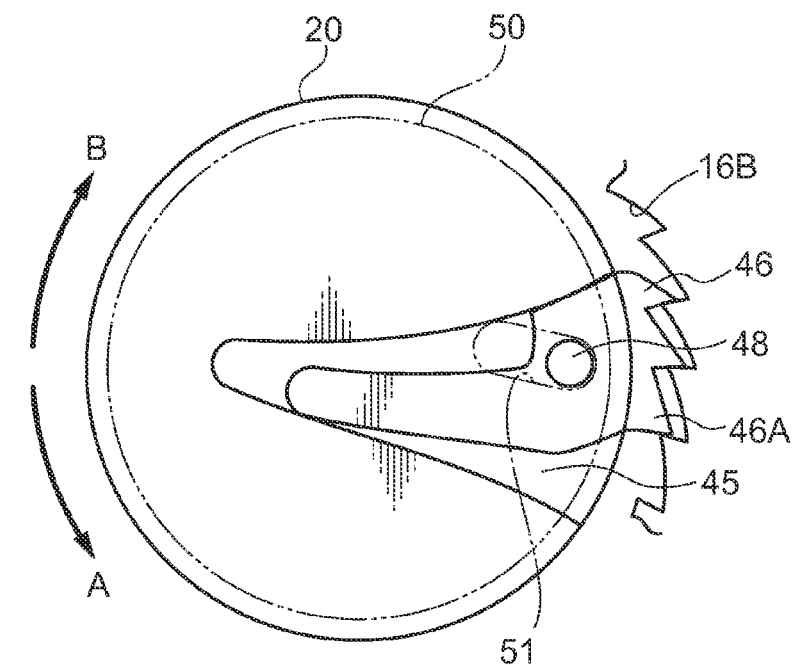

Further, as shown in FIG. 3A and FIG. 3B, an elongate guide groove 51 is formed in the side surface of the V gear 50 on the lock base 41 side. The distal end portion of the guide projection 48 of the lock plate 46 is inserted into the guide groove 51. For this reason, the guide projection 48 is locked in one end of the guide groove 51 by the biasing force of the return spring 44 (the state shown in FIG. 3A). As a result of the guide projection 48 being locked in the one end of the guide groove 51, the rotation of the V gear 50 in the pulled-out direction with respect to the lock base 41 by the return spring 44 is locked, so that ordinarily the V gear 50 is configured to be rotatable integrally with the lock base 41 (the spool 20).

As shown in FIG. 1 and FIG. 2, the V gear 50 has a housing portion 56 opening toward the opposite side of the lock base 41 side. A cylindrical support shaft 58 is disposed upright in the housing portion 56 so as to be parallel to the axial direction of the through hole 52. Further, a rectangular prism-shaped stopper 59 is formed in the housing portion 56 on the pulled-out direction side of the support shaft 58. Moreover, a cylindrical boss 53 and a cylindrical boss 55 serving as a touching portion are formed in the housing portion 56 on the retraction direction side of the support shaft 58. A cross-sectionally L-shaped columnar rib 57 is formed on the through hole 52 side of the boss 55. A cross-sectionally substantially semicircular projecting portion 57A serving as a touching portion is integrally disposed on the rib 57 so as to oppose the boss 55.

Further, a W pawl 60 serving as an engaging member (a meshing member) and as a rotation detecting member is placed in the housing portion 56. The W pawl 60 is formed in a substantial C shape as seen in a front view. A cross-sectionally substantially semicircular support hole 62 is disposed in the central portion of the W pawl 60. The support shaft 58 of the housing portion 56 is inserted into the support hole 62. The W pawl 60 is pivotally supported so as to be swingable in a predetermined range about the axis of the support shaft 58. An engaging convex portion 67 is disposed on one end (the end on the retraction direction side) of the W pawl 60. The engaging convex portion 67 corresponds to one end portion of a sensor spring 74 described later.

A sensor spring 74 serving as biasing member is placed in the housing portion 56 of the V gear 50. The sensor spring 74 is a cross-sectionally L-shaped plate-like spring. One lengthwise direction end portion of the sensor spring 74 is locked on the engaging convex portion 67. The other lengthwise direction end portion of the sensor spring 74 is locked on the V gear 50. Because of this, the sensor spring 74 biases the W pawl 60 toward the pulled-out direction side about the axis of the support shaft 58.

An engaging tooth 64 is formed on the other end (the end on the pulled-out direction side) of the W pawl 60. The engaging tooth 64 touches the stopper 59 of the V gear 50 as a result of the W pawl 60 being biased toward the pulled-out direction side about the axis of the support shaft 58 by the sensor spring 74 (the state shown in FIG. 1A; this state will be called a "standby state"). The engaging tooth 64 moves closer to the ratchet teeth 82 of the sensor holder 80 and meshes with the ratchet teeth 82 as a result of the W pawl 60 being swung in the retraction direction about the axis of the support shaft 58 (the direction of arrow C in FIG. 1A; this direction will be called a "lock activation direction"). Because of this, the rotation of the V gear 50 in the pulled-out direction is regulated (the state shown in FIG. 1B; in this state, the rotation of the V gear 50 in the retraction direction is permitted). On the other hand, the engaging tooth 64 is moved away from the ratchet teeth 82 as a result of the W pawl 60 being swung toward the standby state side. Because of this, the regulation of the rotation of the V gear 50 in the pulled-out direction is released.

Further, an engaging surface 63 is formed on one end of the W pawl 60 on the radial direction outside portion of the W pawl 60. The engaging surface 63 corresponds to an engaging portion 70A of a pawl ELF 70 described later. Moreover, a recessed portion 65 serving as an avoiding portion is disposed in the W pawl 60 on the W pawl 60 radial direction inside portion of the engaging surface 63. The webbing retractor 10 is given a configuration where, when the engaging portion 70A of the pawl ELF 70 described later is displaced toward the radial direction inside of the V gear 50 and the W pawl 60 is swung in the lock activation direction, the engaging portion 70A of the pawl ELF 70 does not interfere with the W pawl 60 because of the recessed portion 65.

A bent rod-like friction spring 75 serving as a biasing member that configures a frictional force generating member of a regulating member is placed in the housing portion 56 of the V gear 50. One end portion of the friction spring 75 is fitted inside the boss 53 of the housing portion 56 and is supported such that it may freely rotate in the boss 53. The friction spring 75 is bent in a substantial U shape as seen in a front view. From one end to the other end of the friction spring 75, the middle portion of the friction spring 75 extends gradually in a direction toward the opposite side of the lock base 41 side (the sensor holder side).

An elongate pawl ELF 70 serving as an engaging member that configures the regulating member is attached along the lengthwise direction of the friction spring 75 to one end side portion of the friction spring 75. An attachment hole 71 is formed in one lengthwise direction end of the pawl ELF 70, and the boss 53 of the housing portion 56 is inserted into the attachment hole 71. Because of this, the pawl ELF 70 is supported such that it may freely rotate in the V gear 50. Further, an engaging portion 70A is disposed on the other lengthwise direction end of the pawl ELF 70. When the V gear 50 is rotated in the retraction direction, the pawl ELF 70 is placed vertically in the radial direction of the V gear 50 in a state where the lengthwise direction middle portion of the pawl ELF 70 touches the boss 55 of the V gear 50, and the engaging portion 70A engages with (touches) the engaging surface 63 of the W pawl 60, whereby the pawl ELF 70 regulates the swinging of the W pawl 60 in the lock activation direction (this state called a "regulating position" is shown in FIG. 1A).

A substantially cylindrical contact body 78 serving as a contact member that configures the frictional force generating member of the regulating member is disposed on the other end portion of the friction spring 75. The distal end portion of the contact body 78 is formed in a sphere. The distal end portion of the contact body 78 is brought into contact with the sensor holder 80 by the biasing force of the friction spring 75. When the V gear is rotated, frictional force is generated between the contact body 78 and the sensor holder 80, and the contact body 78, the friction spring 75, and the pawl ELF 70 are integrally rotated.

For this reason, when the V gear 50 is rotated in the pulled-out direction, the contact body 78, the friction spring 75, and the pawl ELF 70 are rotated about the axis of the boss 53 of the V gear 50, whereby the pawl ELF 70 is rotated from the regulating position about the axis of the boss 53, and the lengthwise direction middle portion of the pawl ELF 70 touches the projecting portion 57A of the V gear 50. Consequently, the engaging portion 70A of the pawl ELF 70 is moved away from the engaging surface 63 of the W pawl 60 and is moved toward the recessed portion 65 of the W pawl 60 (the engaging portion 70A of the pawl ELF 70 is displaced toward the radial direction inside of the V gear 50) (the state shown in FIG. 1B; called a "non-regulating position"). Because of this, the swinging of the W pawl 60 in the lock activation direction is permitted, and when the V gear 50 is abruptly rotated in the pulled-out direction, the W pawl 60 is swung in the lock activation direction by inertial force (including centrifugal force), whereby the engaging tooth 64 of the W pawl 60 moves closer to the ratchet teeth 82 of the sensor holder 80 and meshes with the ratchet teeth 82. Consequently, the rotation of the V gear 50 in the pulled-out direction is regulated (the rotation of the V gear 50 in the retraction direction is permitted).

Further, when the V gear 50 is rotated in the retraction direction, the contact body 78, the friction spring 75, and the pawl ELF 70 are rotated about the axis of the boss 53 of the V gear 50, whereby the engaging portion 70A of the pawl ELF 70 engages with (touches) the engaging surface 63 of the W pawl 60, and the swinging of the W pawl 60 in the lock activation direction is regulated (the state shown in FIG. 1A).

Here, as shown in FIG. 3A and FIG. 3B, when the rotation of the V gear 50 in the pulled-out direction is regulated in a state where the spool 20 and the V gear 50 are rotated in the pulled-out direction, the lock base 41 (the spool 20) is relatively rotated in the pulled-out direction with respect to the V gear 50 counter to the biasing force of the return spring 44 (the V gear 50 is relatively rotated in the retraction direction with respect to the lock base 41/the spool 20). At this time, the guide projection 48 of the lock plate 46 is moved from the one end of the guide groove 51 in the V gear 50 to the other end, and the lock plate 46 is moved toward the radial direction outside of the lock base 41 (the lock plate 46 is moved from the state shown in FIG. 3A to the state shown in FIG. 3B). Because of this, the ratchet teeth 46A of the lock plate 46 mesh with the ratchet teeth 16B of the leg plate 16 of the frame 12, whereby the rotation of the lock plate 46 in the pulled-out direction is regulated and the rotation of the spool 20 in the pulled-out direction is regulated (the state shown in FIG. 3B; the rotation of the lock plate 46 and the spool 20 in the retraction direction is permitted).

Next, the action of the present embodiment will be described.

In the webbing retractor 10, when the webbing 30 in a state where it is retracted onto the spool 20 is pulled toward its distal end side counter to the biasing force of the spiral spring, the webbing 30 is pulled out and the spool 20 is rotated in the pulled-out direction.

The webbing 30 that has been pulled out is placed around the body of an occupant, and, for example, a tongue plate disposed on the lengthwise direction middle portion of the webbing 30 is held in a buckle device disposed on the side of a seat in the vehicle, whereby the webbing 30 is worn on the body of the occupant.

When the vehicle suddenly decelerates, the body of the occupant moves substantially toward the front side of the vehicle and abruptly pulls the webbing 30. At this time, the webbing 30 is abruptly pulled out from the spool 20, whereby the spool 20 (including the support shaft 22 and the lock base 41) is abruptly rotated in the pulled-out direction, and the V gear 50 is abruptly rotated in the pulled-out direction together with the W pawl 60, the friction spring 75, the pawl ELF 70, and the contact body 78.

At this time, frictional force is generated between the contact body 78 and the sensor holder 80, whereby the contact body 78, the friction spring 75, and the pawl ELF 70 are integrally rotated about the axis of the boss 53 of the V gear 50. For this reason, the engaging portion 70A of the pawl ELF 70 is moved toward the recessed portion 65 of the W pawl 60, whereby the relative swinging of the W pawl 60 in the lock activation direction with respect to the V gear 50 is permitted.

For this reason, the V gear 50 is abruptly rotated in the pulled-out direction, whereby the W pawl 60 tries to stay in that position without rotating with respect to the V gear 50 because of inertial force and is swung in the lock activation direction relatively with respect to the V gear 50 counter to the biasing force of the sensor spring 74. Because of this, the engaging tooth 64 of the W pawl 60 moves closer to and meshes with the ratchet teeth 82 of the sensor holder 80 (the state shown in FIG. 1B).

The engaging tooth 64 of the W pawl 60 meshes with the ratchet teeth 82 of the sensor holder 80, whereby the rotation of the V gear 50 in the pulled-out direction is regulated and the lock base 41 (the spool 20) is relatively rotated in the pulled-out direction with respect to the V gear 50 counter to the biasing force of the return spring 44 (the V gear 50 is relatively rotated in the retraction direction with respect to the lock base 41).

As a result of the lock base 41 (the spool 20) being relatively rotated in the pulled-out direction with respect to the V gear 50, the guide projection 48 of the lock plate 46 is moved from the one end of the guide groove 51 in the V gear 50 to the other end, and the lock plate 46 is moved toward the radial direction outside of the lock base 41. For this reason, the ratchet teeth 46A of the lock plate 46 mesh with the ratchet teeth 16B of the leg plate 16 of the frame 12, whereby the rotation of the lock plate 46 in the pulled-out direction is regulated and the rotation of the spool 20 in the pulled-out direction is regulated (the state shown in FIG. 3B). Because of this, the body of the occupant trying to move by inertia toward the vehicle front side is reliably restrained and held by the webbing 30.

On the other hand, when the webbing 30 that has been pulled out from the spool 20 is to be retracted onto the outer periphery of the spool 20, the spool 20 (including the support shaft 26 and the lock base 42) is rotated in the retraction direction by the biasing force of the spiral spring. At this time, following the spool 20, the V gear 50 is rotated in the retraction direction together with the W pawl 60, the friction spring 75, the pawl ELF 70, and the contact body 78. Moreover, frictional force is generated between the contact body 78 and the sensor holder 80, whereby the contact body 78, the friction spring 75, and the pawl ELF 70 are integrally rotated about the axis of the boss 53 of the V gear 50. For this reason, the engaging portion 70A of the pawl ELF 70 is moved toward the engaging surface 63 from the recessed portion 65 of the W pawl 60. Because of this, the relative swinging of the W pawl 60 in the lock activation direction with respect to the V gear 50 is regulated.

In a state where the spool 20 is rotating in the retraction direction, the contact body 78, the friction spring 75, and the pawl ELF 70 are held in the regulating position. Further, when the spool 20 has finished retracting the webbing 30, even if the spool 20 and the V gear 50 abruptly and slightly rotate in the pulled-out direction due to rebound, the state where the friction spring 75 and the contact body 78 are in the regulating position is maintained and the state where the engaging portion 70A of the pawl ELF 70 is engaged with the engaging surface 63 is maintained.

For this reason, when the spool 20 has finished taking up the webbing 30, even if a large acceleration in the pulled-out direction arises in the V gear 50 and the W pawl 60 tries to relatively swing in the lock activation direction with respect to the V gear 50 by inertial force, the swinging of the W pawl 60 in the lock activation direction is regulated by the engagement of the engaging portion 70A of the pawl ELF 70 with the engaging surface 63. Consequently, the engaging tooth 64 of the W pawl 60 does not mesh with the ratchet teeth 82 of the sensor holder 80, and the webbing retractor 10 can be effectively prevented from entering a so-called "end lock state" (where the pulled-out of the webbing 30 from the spool 20 is locked).

In the present embodiment, the engaging portion 70A of the pawl ELF 70 is displaced toward the radial direction inside of the V gear 50 by the rotation of the V gear 50 in the pulled-out direction, whereby the engaging portion 70A is moved away from the engaging surface 63 of the W pawl 60. Because of this, the engaging portion 70A is moved toward the recessed portion 65 of the W pawl 60, whereby the relative swinging of the W pawl 60 in the lock activation direction with respect to the V gear 50 is permitted.

For this reason, it is not necessary to dispose space in which the engaging portion 70A of the pawl ELF 70 is displaced toward the radial direction outside of the V gear 50 from the engaging surface 63 of the W pawl 60, so the V gear 50 can be miniaturized.

Moreover, the engaging portion 70A of the pawl ELF 70 is rotated toward the V gear 50 radial direction inside of the W pawl 60, and the engagement of the engaging portion 70A with the W pawl 60 is released, so it is not necessary to form, on the V gear 50 radial direction outside portion of the W pawl 60, a recessed portion for releasing the engagement between the pawl ELF 70 and the W pawl 60. Because of this, the weight of the V gear 50 radial direction outside portion of the W pawl 60 can be made large. The larger the weight of the V gear 50 radial direction outside portion of the W pawl 60 is, the more the W pawl 60 can efficiently relatively swing with respect to the V gear 50 because of inertial force, so the W pawl 60 can be made small. That is, the V gear 50 can be further miniaturized.

Further, the friction spring 75 is disposed extending toward the engaging portion 70A from the center of rotation of the pawl ELF 70. For this reason, the overlapping portion in the V gear 50 between the placement region of the pawl ELF 70 and the placement region of the friction spring 75 can be made large. Because of this, the region for placing the pawl ELF 70 and the friction spring 75 in the V gear 50 can be made small, and the V gear 50 can be miniaturized.

In the present embodiment, the webbing retractor 10 has been given a configuration where the W pawl 60 is relatively rotated with respect to the V gear 50 and the engaging tooth 64 of the W pawl 60 meshes with the ratchet teeth 82 of the sensor holder 80. Instead of this, the webbing retractor 10 may be given a configuration where the W pawl 60 and the engaging tooth 64 are separate members. In this case, the W pawl 60 is relatively displaced with respect to the V gear 50, whereby the engaging tooth 64 is relatively displaced with respect to the V gear 50 by the W pawl 60 and the engaging tooth 64 meshes with the ratchet teeth 82.

Further, in the present embodiment, the webbing retractor 10 has been given a configuration where the pawl ELF 70 is attached to the friction spring 75 and the friction spring 75 and the pawl ELF 70 are rotated about the axis of the boss 53 of the V gear 50. Instead of this, the webbing retractor 10 may be given a configuration that omits the pawl ELF 70. In this case, for example, the bent portion of the friction spring 75 is caused to engage with the engaging surface 63 of the W pawl 60 as the engaging portion 70A.

Moreover, in the present embodiment, the webbing retractor 10 has been given a configuration where the contact body 78 is attached to the other end portion of the friction spring 75 and the contact body 78 contacts the sensor holder 80. Instead of this, the webbing retractor 10 may be given a configuration that omits the contact body 78. In this case, for example, the other end portion of the friction spring 75 is caused to contact the sensor holder 80.

What is claimed is:

1. A webbing retractor comprising:
a retracting shaft onto which webbing worn on an occupant of a vehicle is retracted as a result of being rotated in a retraction direction and which is rotated in a pulled-out direction as a result of the webbing being pulled out;
a lock member that regulates the rotation of the retracting shaft in the pulled-out direction as a result of being actuated;
a rotating body that is connected to, so as to be capable of following the rotation of, the retracting shaft;
a rotation detecting member that is disposed so as to be relatively displaceable in the rotating body, is relatively displaced with respect to the rotating body by inertial force in a case where the rotating body has been rotated in the pulled-out direction, by which rotation of the rotating body in the pulled-out direction is regulated, and by which the lock member is actuated; and
a regulating member that is disposed in the rotating body, has an engaging portion that engages with the rotation detecting member because of the rotation of the rotating body in the retraction direction, is configured to regulate the relative displacement of the rotation detecting member with respect to the rotating body resulting from rebound of the stopping of the retraction of the webbing onto the retracting shaft, and in which the engagement of the engaging portion with the rotation detecting member is released as a result of the engaging portion being displaced toward a radially inward direction inside of the rotating body by the rotation of the rotating body in the pulled-out direction,
wherein the regulating member has a support member that is rotatably supported in the rotating body and terminates in the engaging portion and further includes a frictional force generating member that is secured to the support member, the frictional force generating member extending away from the engaging portion toward a center of rotation of the support member, such that the frictional force generating member generates frictional force because of the rotation of the rotating body in the pulled-out direction, and by which the engaging portion is displaced toward the radially inward direction inside of the rotating body.

2. The webbing retractor according to claim 1, wherein the rotation detecting member has an avoiding portion that avoids the engagement of the engaging portion when the engaging portion has been displaced toward the radially inward direction inside of the rotating body.

3. The webbing retractor according to claim 1, wherein the engaging portion of the regulating member is configured to be displaced only toward the radially inward direction inside of the rotating body by rotation of the rotating body in a pulled-out direction.

4. The webbing retractor according to claim 1, further comprising a sensor holder that houses the rotating body and the rotation detection member, wherein the frictional force generating member is frictionally engaged to the sensor holder.

* * * * *